United States Patent

Feser et al.

(10) Patent No.: US 8,744,690 B2
(45) Date of Patent: Jun. 3, 2014

(54) METHOD FOR DETERMINING A CRITERION OF THE SEVERITY OF AN ACCIDENT BY MEANS OF AN ACCELERATION SIGNAL AND A SOLID-BORNE SOUND SIGNAL

(75) Inventors: Michael Feser, Barbing (DE); Christian Smykalla, Regensburg (DE); Andreas Forster, Wörth (DE); Udo Geissler, Blankenbach (DE)

(73) Assignee: Continental Automotive GmbH (DE)

( * ) Notice: Subject to any disclaimer, the term of this patent is extended or adjusted under 35 U.S.C. 154(b) by 617 days.

(21) Appl. No.: 13/059,106

(22) PCT Filed: May 27, 2009

(86) PCT No.: PCT/DE2009/000754

§ 371 (c)(1),
(2), (4) Date: Apr. 22, 2011

(87) PCT Pub. No.: WO2010/022692

PCT Pub. Date: Mar. 4, 2010

(65) Prior Publication Data

US 2011/0190989 A1    Aug. 4, 2011

(30) Foreign Application Priority Data

Aug. 27, 2008   (DE) .......................... 10 2008 039 957

(51) Int. Cl.
*G06F 17/00* (2006.01)
*G06F 19/00* (2011.01)
*B60R 21/01* (2006.01)

(52) U.S. Cl.
USPC ............................. 701/45; 701/47; 180/271

(58) Field of Classification Search
USPC ........ 701/45, 46, 47, 70, 29.1, 34.4; 180/268, 180/271; 340/425.5, 438, 440
See application file for complete search history.

(56) References Cited

U.S. PATENT DOCUMENTS

| 7,278,657 B1 | 10/2007 | McCurdy |
| 2009/0276125 A1* | 11/2009 | Brandmeier et al. ........... 701/47 |
| 2010/0017068 A1 | 1/2010 | Rauh et al. |
| 2010/0042296 A1 | 2/2010 | Brandmeier et al. |
| 2010/0191401 A1 | 7/2010 | Mack et al. |

FOREIGN PATENT DOCUMENTS

| DE | 197 42 606 B4 | 4/1999 |
| DE | 10 2005 048 790 A1 | 4/2007 |
| DE | 10 2006 001 366 A1 | 7/2007 |
| DE | 10 2006 014 915 A1 | 10/2007 |
| DE | 10 2006 038 844 A1 | 2/2008 |
| DE | 10 2006 042 769 B3 | 4/2008 |
| DE | 10 2007 006 771 A1 | 8/2008 |
| EP | 0 904 989 A2 | 3/1999 |

* cited by examiner

*Primary Examiner* — Thomas Tarcza
*Assistant Examiner* — Edward Pipala
(74) *Attorney, Agent, or Firm* — RatnerPrestia

(57) ABSTRACT

A method for determining a criterion of the severity of an accident by means of an acceleration signal and a solid-borne sound signal. The signal edge direction of the absolute value of the acceleration signal is detected. If the signal edge of the absolute value of the acceleration signal drops, the solid-borne sound signal which occurs in the process is evaluated. The solid-borne sound signal may be integrated and the criterion of the severity of the accident is derived therefrom. This criterion of the severity of the accident can be used directly, or as a function of criteria, to trigger the protection devices.

10 Claims, 7 Drawing Sheets

METHOD FOR DETERMINING A CRITERION OF THE SEVERITY OF AN ACCIDENT BY MEANS OF AN ACCELERATION SIGNAL AND A SOLID-BORNE SOUND SIGNAL

CROSS REFERENCE TO RELATED APPLICATIONS

This application is the U.S. national phase application of PCT International Phase Application No. PCT/DE2009/000754, filed May 27, 2009, which claims priority to German Patent Application No. 10 2008 039 957.4, filed Aug. 27, 2008, the contents of such applications being incorporated by reference herein.

FIELD OF THE INVENTION

The invention relates to a method for determining a criterion of the severity of an accident by means of an acceleration signal and a solid-borne sound signal.

BACKGROUND OF THE INVENTION

For effectively protecting occupants of a motor vehicle as well as other road users in case of a collision, a fast and reliable detection of an impact and a correct evaluation of the severity of an accident is necessary. The sensor technology shall recognize an impact within the shortest possible time, but shall, however, only lead to a triggering of the protection devices for occupants and other road users, if the severity of the accident is correspondingly high, since the protection devices cannot be easily reset in many cases. Shocks, curb jostles or a hammer blow or a rock fall against the outside vehicle skin at first show rather significant amplitudes, however, they may not lead to the triggering.

For this purpose, for decades the low-frequency acceleration directed against the direction of travel arising with the impact, i.e. the delay is evaluated, the integral of which essentially describes the reduction of speed in the impact. Due to the safety crumble zones of the vehicle, however, the acceleration signals in the interior of the vehicle occur clearly delayed in case of an impact. Acceleration sensors, so-called pole catchers, upfront sensors or side satellites, displaced from the interior into the edge region of the vehicle, can in fact respond much earlier for the respective impact zone, however, they act only locally and must therefore be mounted in larger number, which in turn increases the costs significantly.

Therefore, during the last years intensive research has been carried out into the use of alternative sensor concepts. In doing so, high-frequency oscillations in the vehicle body, also called solid-borne sound, are considered in the impact. If acceleration sensors are sufficiently sensitive also for high-frequency oscillations, then they can detect apart from the low-frequency acceleration signals also the superimposed high-frequency solid-borne sound signals.

The solid-borne sound results from the resulting oscillations with force applied on the body, wherein solid-borne sound reacts both on plastic as well as on elastic deformations and has a significantly faster signal propagation time and therefore allows for a much earlier impact recognition. On the other hand solid-borne sound signals occur also with conventional non-trigger cases in significant strength, so that it was difficult to reliably judge on this basis the severity of the accident.

SUMMARY OF THE INVENTION

It is, therefore, an object of the present invention to indicate a suitable method for determining a criterion of the severity of an accident by means of an acceleration signal and a solid-borne sound signal, which on the one hand allows for an early evaluation, which is also secure against non-trigger cases.

Advantageous developments of aspects of the invention are described herein.

A substantial thought of aspects of the invention is that for heavy accidents severe plastic deformations of the vehicle body are significant. With these deformations in the acceleration signal local changes in the signal edge direction occur, i.e. for a certain period of time the delay gets smaller due to the yielding of the body elements. The solid-borne sound signals which occur in the process are particularly significant for the severity of the accident.

Consequently, for determining the criterion of the severity of an accident with a dropping signal edge of the absolute value of the acceleration signal the solid-borne sound signal and/or acceleration signal which occurs in the process is evaluated and the criterion of the severity of an accident is derived therefrom. By this forming of the absolute value only the amplitude of the signal without sign is considered. Usually in the field of passive safety a negative amplitude is assigned to the acceleration signal with a positive acceleration in direction of travel. Thus, the dropping signal edge corresponds to the signal edge direction which is negative in the mathematical sense. As far as, however, a positive amplitude is assigned to the acceleration signal with a positive acceleration in direction of travel, in the delay the dropping signal edge corresponds to the signal edge direction which is positive in the mathematical sense in its all in all negative region. For avoiding this case distinction the signal edge is defined with regard to the absolute value of the acceleration signal, which in the end however describes the identical phase in each case.

Depending on the requirements of the vehicle this criterion of an accident on its own can lead to a triggering of protection devices or can still be made dependent on the presence of further criteria.

For this method and for this criterion of the severity of an accident the solid-borne sound is evaluated exclusively during the predetermined signal edge direction, i.e. for example integrated. This, however, does not exclude the fact that for other trigger criteria also other regions of the solid-borne sound signal or acceleration signal can be evaluated, for example beyond all time ranges.

Preferably, for the period of time of the presence of the predetermined signal edge direction of the acceleration signal the intensity of the solid-borne sound signal is evaluated, such as the integral on the absolute value of the amplitude of the solid-borne sound signal, this means the sum of the samples is determined for this period of time. In an embodiment of the invention the integral is compared during the predetermined signal edge direction with a threshold value and when exceeding this threshold value this criterion of the severity of an accident is set to a trigger decision. In an example of embodiment it is supplementarily provided that the integral is determined via a plurality of intervals with predetermined signal edge direction, wherein under omission of the predetermined signal edge direction the integration is stopped and the determined integration value is gradually reduced in accordance with a predetermined reduction process and with a renewed presence of the predetermined signal edge direction the integration is continued with the integration value correspondingly reduced by the reduction process. The strength of the individual locally dropping signal edges in the acceleration process all in all increasing during the impact are in fact rather small in the ratio to the total acceleration, however, they refer to those periods of time, in which the solid-borne sound is particularly strongly due to the plastic deformation of the body parts and is thus significant for the severity of the accident.

Preferably, the determination of this criterion of the severity of an accident is started, only if a minimum absolute value of the acceleration is exceeded, so that with smaller shocks no further evaluation of acceleration and solid-borne sound must take place. Preferably, the signal edge direction is recognized from the difference of successive acceleration values and a change of the signal edge direction is recognized as such only if the difference exceeds a predetermined threshold. This leads to a certain smoothing and makes it possible to recognize the signal edge direction as a whole more safely and not to react to each smallest change.

In an alternative development the measurement of the solid-borne sound signal and of the comparison with a minimum threshold is prepended, i.e. solid-borne sound signal is compared with a minimum threshold and is evaluated only, if on the one hand the solid-borne sound signal exceeds this minimum threshold, on the other hand however the signal edge of the absolute value of the acceleration signal drops. If this may deviate in the sequence of the comparisons to be accomplished from the preceding methods, then nevertheless also this embodiment comprises the basic consideration of the dropping signal edge of the absolute value of the acceleration, although this is verified here as the second step.

BRIEF DESCRIPTION OF THE DRAWINGS

The invention is now described in detail in the following on the basis of an example of embodiment with the aid of the accompanying drawings. In the following functionally identical and/or identical elements may be referred to with the same reference numerals. Dimensions as well as concrete values at concrete periods of time are only determined purely exemplarily on the basis of an individual type of vehicle and thus do not restrict the invention.

The drawings show

FIG. 2: influence of deformable body elements on the force characteristic, with FIG. 2b illustrating material with predetermined folding points;

FIG. 3: acceleration and solid-borne sound exemplarily for a trigger scenario (FIG. 3a) as well as a non-trigger test (FIG. 3b);

FIG. 4: acceleration and solid-borne sound exemplarily for a trigger scenario (FIG. 4a) as well as a non-trigger test with an alternative interpretation of the algorithm (FIG. 4b);

DETAILED DESCRIPTION OF THE PREFERRED EMBODIMENTS

Figure 1:
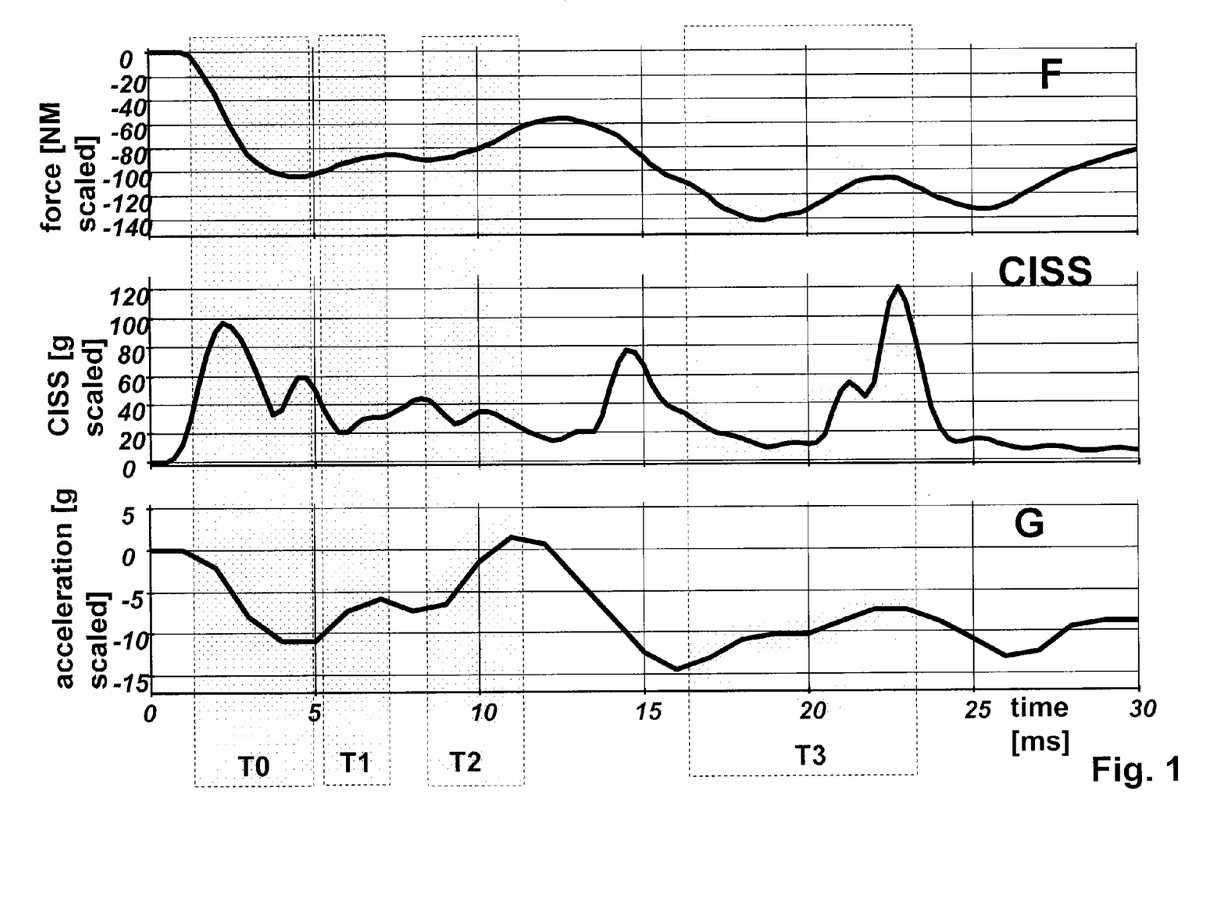
FIG. 1: characteristic of force, acceleration and solid-borne sound for the time in the initial phase of an impact.

FIG. 1 shows an exemplarily characteristic of force applied on a vehicle in an impact, of acceleration measurable in the vehicle as well as of solid-borne sound which occurs in this process. The direction of the force F and acceleration G are here positive in the direction of travel, i.e. in the impact the amplitudes are correspondingly negative.

The period of time T0 represents here the first contact with the deformation elements, which as is known effects already significant amplitudes with acceleration and solid-borne sound, but is not yet significant for a heavy impact.

Figures 2, 2B:
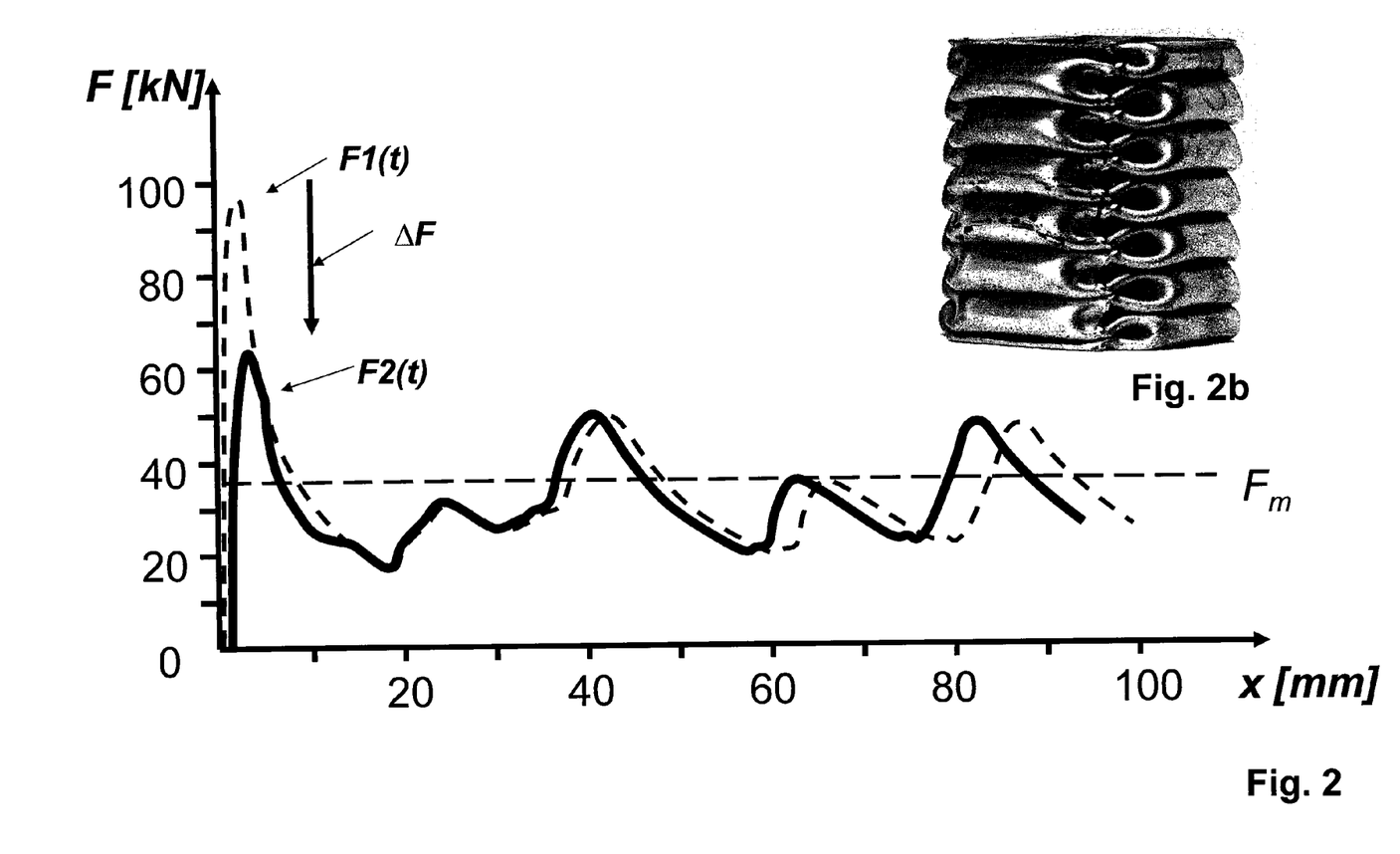

However, a local drop of the acceleration value occurs to the periods of time T1, T2 and T3. This drop is measurable, although in the ratio to the absolute value of the acceleration it is relatively small and rather not suitable for an exclusive evaluation. This drop is caused by plastic deformations of defined crumble zones in the vehicle body. FIG. 2 outlines by a solid line the characteristic with an element by a predetermined folding point (notch in the material—See FIG. 2b), the broken line marks the characteristic without such predetermined folding points, which visibly effect a significantly reduced first force maximum.

If in turn in FIG. 1 the characteristic of the amplitude absolute value of the solid-borne sound CISS is considered, then it becomes apparent that the solid-borne sound shows in an early stage first significant amplitudes, which however cannot yet be associated free of doubts to a heavy accident, since they represent only the first impact, which is to be clearly seen also with the acceleration. Only thereafter the deformation starts, which actually is of interest for the triggering of the protection devices.

If however the occurring solid-borne sound signal during the dropping signal edges of the absolute value of the acceleration signal is evaluated, then a criterion of the severity of an accident can be derived therefrom. In doing so, preferably the difference of successive acceleration values is determined and a change of signal edge direction is recognized therefrom, if the difference exceeds a predetermined threshold. The time windows T1, T2 and T3 begin and end therefore in this example of embodiment somewhat delayed in relation to the acceleration signal process. For this criterion of the severity of an accident however the solid-borne sound signal is evaluated, and may be integrated only during these time windows.

Thus for the period of time of the presence of the predetermined signal edge direction, i.e. during T1, T2 and T3 the intensity of the solid-borne sound signal is evaluated, thus for example the integral on the absolute value of the amplitude of the solid-borne sound signal is determined, wherein with the presence of digitized solid-borne sound signal values the integration can be made by summation via the values. The integral is compared during the predetermined signal edge direction with a threshold value and when exceeding the threshold value this criterion of the severity of an accident is set on a trigger decision.

The final trigger decision can here naturally still be made dependent on other parameters. However, it may be preferred to determine the integral on a plurality of intervals with predetermined signal edge direction, wherein under omission of the predetermined signal edge direction the integration is stopped and the determined integration value is gradually reduced in accordance with a predetermined reduction process and with a renewed presence of the predetermined signal edge direction the integration is continued with the integration value correspondingly reduced by the reduction process.

If the solid-borne sound signal itself may still be too small in the time intervals T1 and T2 to exceed the threshold value, this already contributes to a certain extent to the increase of the integral value. Experiments with various motor vehicle types however have shown that already in an early stage of a heavy crash a relative large time interval arises with a signal edge dropping in its absolute value of the acceleration signal, with which however a very high intensity of the solid-borne sound is measurable, so that on the preferred integration here an early and safe trigger decision can be made.

Figure 3A:
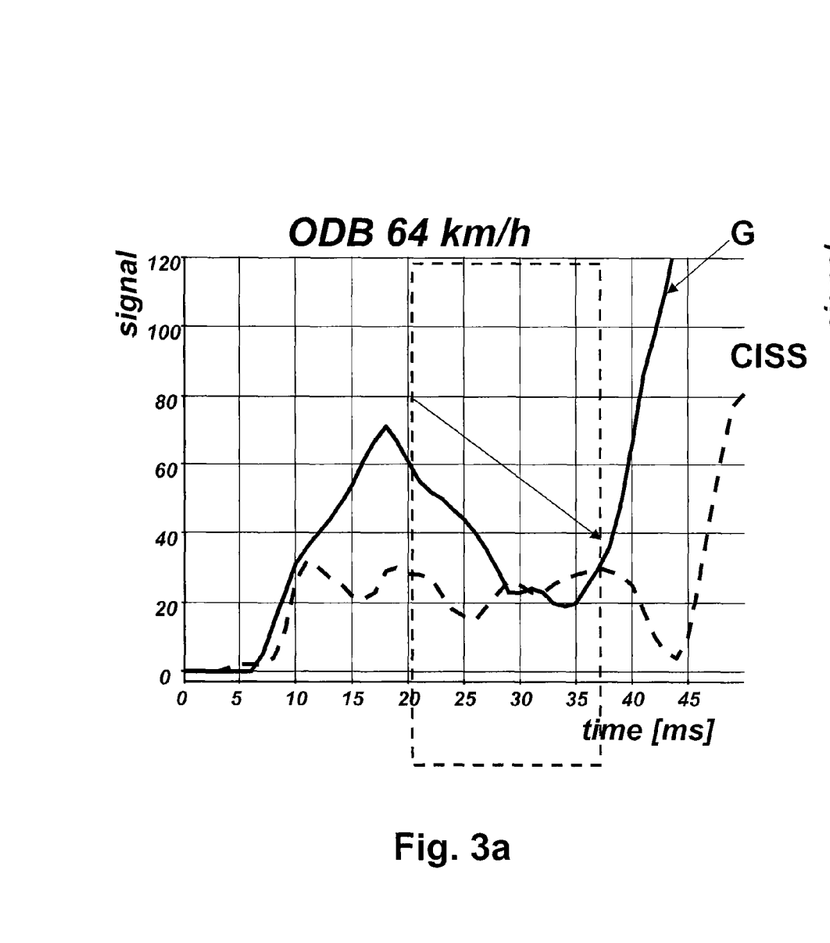
Figure 3B:
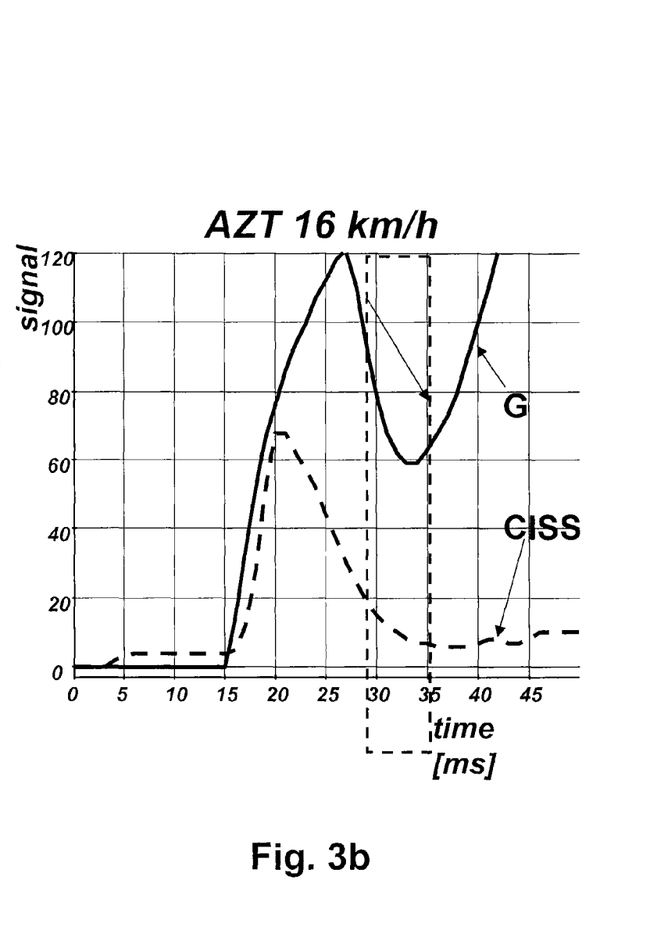

The significance of this method shows a comparison of FIGS. 3a and 3b more clearly. FIG. 3a shows a so-called offset-deformable-barrier impact with 64 km/h, as this is a component of conventional crash tests and defines an impact, in which a triggering is required, however cause problems for classical purely acceleration-based protection systems, since after the first contact the crumble zones of both collision partners yield and thereby the intensive acceleration rise begins only in a clearly delayed manner. However, it can be clearly recognized that in this phase of the yielding of the crumble zones the solid-borne sound signal shows a strong intensity, because the deformation of the crumble zones leads to correspondingly strong material oscillations.

If, however, in FIG. 3b a so-called AZT test is considered, defined by the Allianz Center of Technology as an impact with only 16 km/h against a hard obstacle, which characterizes a classical parking lot accident or a comparable non-trigger cases, then it can be recognized that both acceleration G and solid-borne sound CISS first rapidly rise significantly, so that in this phase a distinction to trigger cases is virtually impossible. If, however, the phase of the dropping signal edge of the acceleration signal is considered, here again marked as a window in dashed lines, then it can be recognized that the solid-borne sound drops here clearly faster and the time window is clearly shorter, so that all in all this leads to a lower total value for the severity of the accident. Exactly by the integration of the absolute value of the solid-borne sound signal via the period of time during this dropping acceleration edge this results in a significant criterion for the severity of the accident. If must be stressed that both cases lie significantly before the period of time, in which conventional purely acceleration-based algorithms can make a safe trigger decision.

Figure 4A:
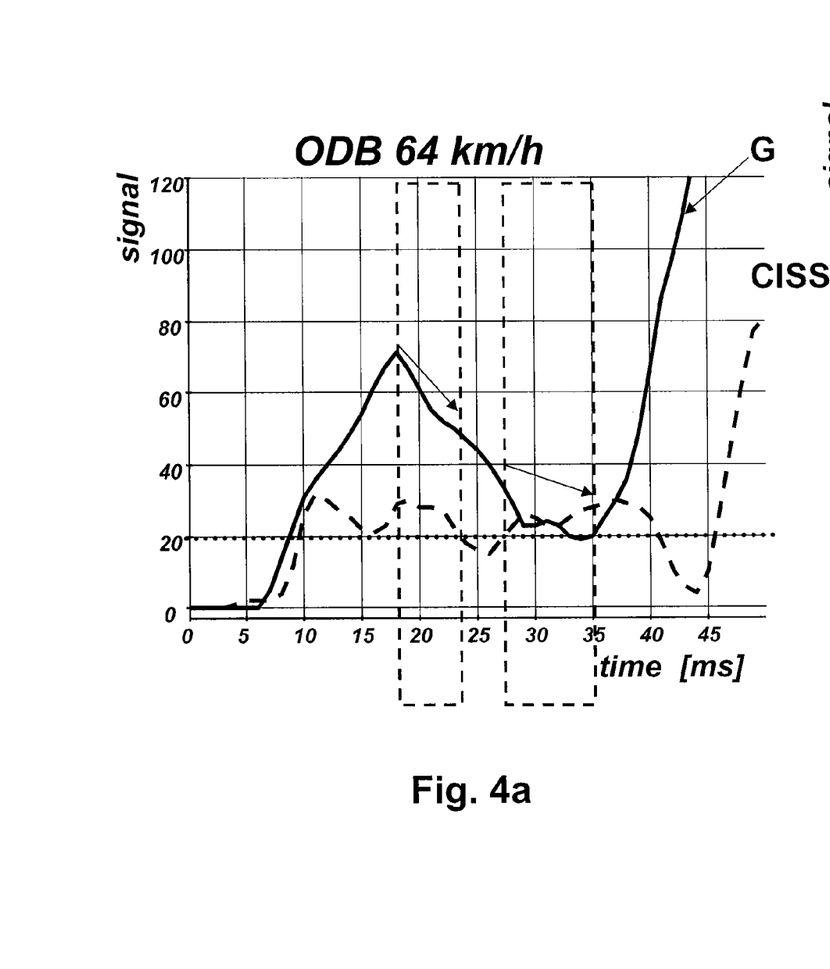
Figure 4B:
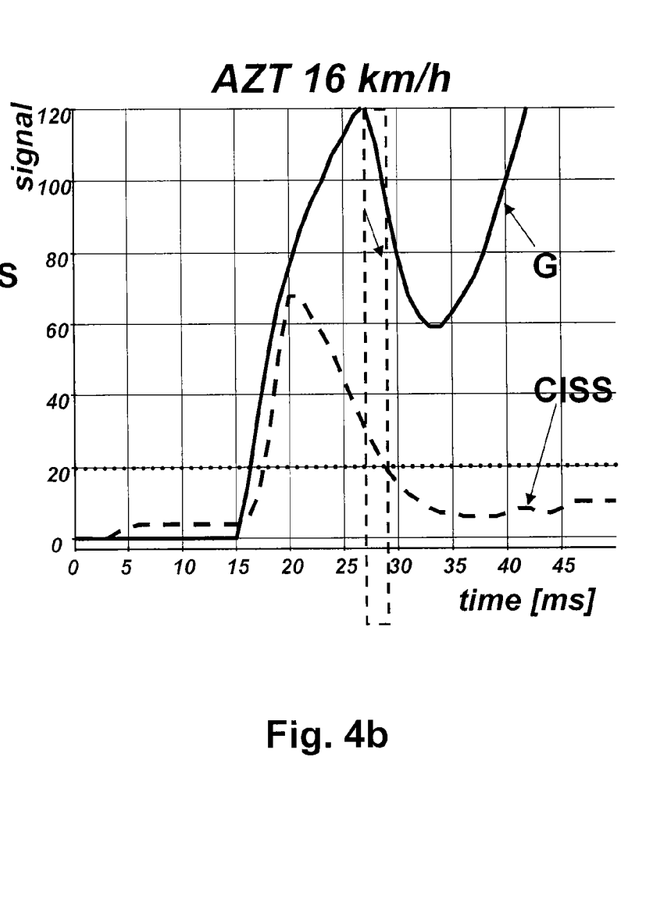

FIGS. 4a and 4b show an alternative evaluation method applied to these two typical impact situations. With this algorithm in addition the solid-borne sound signal is compared with a minimum threshold, which is here defined as a mere example with a value of 20. Although the solid-borne sound signal exceeds this minimum threshold, the evaluation of the solid-borne sound signal or of the acceleration signal, i.e. integration is started only if on the other side the signal edge of the absolute value of the acceleration signal is dropping. Again also the signal edge condition must be fulfilled, although the latter can also be second in the temporal sequence in the algorithm. The example in FIG. 4 makes still clearer on the basis of these two cases that by the signal edge criterion a very good limitation of the evaluation of the solid-borne sound signal to those regions is possible, which are characteristic for the severity of the accident. On the other hand it is made clear that also the acceleration signal in its dropping signal edge can be significantly evaluated, if the solid-borne sound signal is correspondingly strong. This means as an alternative to the integration of the absolute value of solid-borne sound signal also the acceleration signal in its dropping signal edge can be integrated or the period of time of the dropping signal edge can be determined and used as a criterion of the severity of an accident. The period of time of the dropping signal edge is clearly longer with a heavy accident and a plastic deformation than with elastic impacts or shocks, although the maximum values of the acceleration by all means are comparably large. Thus both over the period of time and integration of the acceleration signal in the end the identical basic effect is utilized as with evaluation of the impact sound. This evaluation of the dropping signal edge compared with the classical acceleration algorithms, which independent of the signal edge direction integrate the acceleration, has also the advantage that they are aligned on these deformation phenomena and thus can be designed clearly more sensitive, for example can be used also for reducing a conventional acceleration threshold. With this evaluation of the dropping signal edge of the acceleration however, the solid-borne sound is required to recognize that this is a heavy accident, because naturally a dropping signal edge of the acceleration per se always occurs also with completely uncritical traffic conditions or in non-trigger cases.

Figure 5:
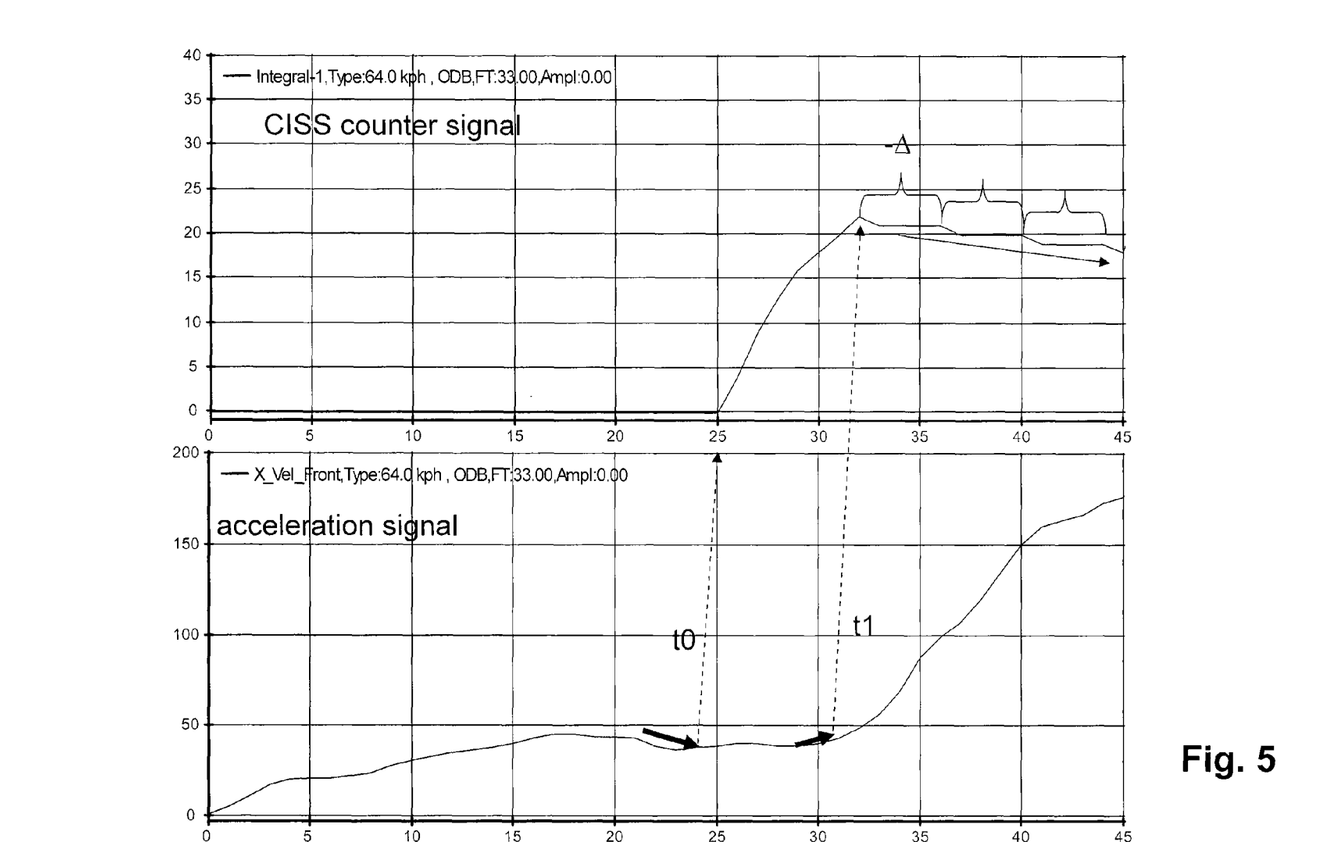
FIG. 5: characteristic of a solid-borne sound integration counter with sketch of the reduction of the count under omission of the predetermined signal edge direction.

FIG. 5 outlines still another solid-borne sound integral counter and shows the gradual decrease of the reached integral value over the time. Thus the integral is determined via a plurality of intervals with predetermined signal edge direction, wherein under omission of the predetermined signal edge direction the integration is stopped and the determined integration value is reduced in $-\Delta$ steps in accordance with a predetermined reduction process, wherein the time interval and strength of each step is defined in vehicle-specific manner.

With a renewed presence of the predetermined signal edge direction the integration is continued with the integration value correspondingly reduced by the reduction process. Thus also a plurality of shorter time intervals of dropping signal edge of the acceleration but intensive solid-borne sound signal can result in reaching the minimum trigger threshold.

Figure 6:
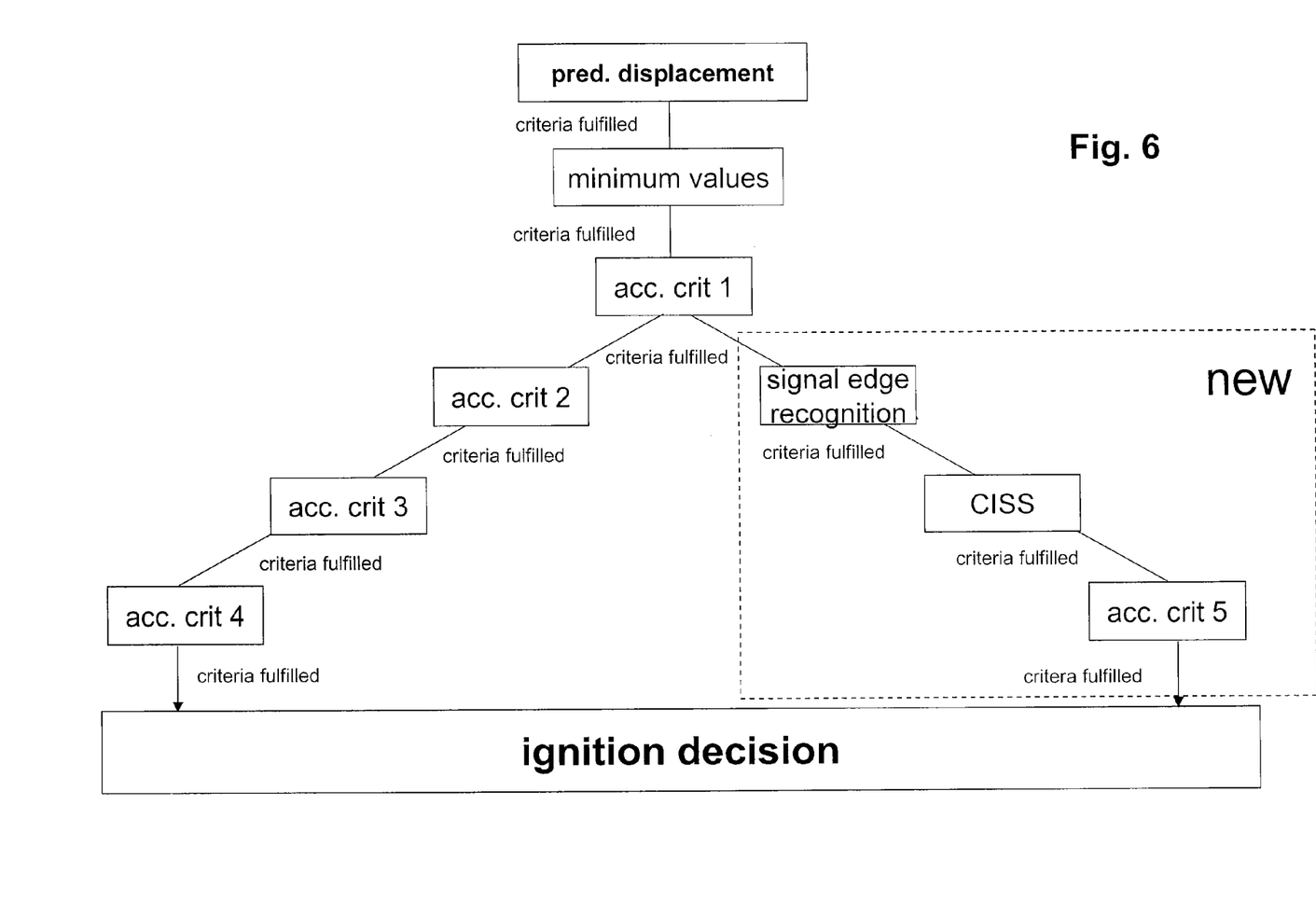
FIG. 6 example of a trigger pattern on the basis of the criterion of the severity of an accident according to an aspect of the invention.

FIG. 6 illustrates an example of an overall triggering algorithm. At first a wake up region with a first acceleration threshold (acc. crit. 1) is provided, on which at first the total further evaluation is started. According to an aspect of the invention a signal edge identification of the acceleration signal is performed and in the periods of time of the dropping signal edges of the absolute value of the acceleration signal the solid-borne sound signal is integrated and compared with a threshold. If the latter is exceeded, the criterion of the severity of an accident is set. For securing the trigger decision on the basis of the solid-borne sound, another acceleration criterion acc. crit. 5 is checked. As is known also a size, derived from the acceleration, in the total or time-window-integral or the acceleration value averaged via a time window can be used as an acceleration criterion, wherein this acceleration criterion acc crit. 5 for the solid-borne sound-based trigger path can be clearly smaller than with conventional purely acceleration-based algorithms.

In addition, on customer's request another redundant purely acceleration-based trigger path with several acceleration-based criteria acc. crit. 2-4 is provided, which independently can likewise lead to the triggering. This trigger path ensures that even with a defect of the solid-borne sound sensor another triggering is possible.

Figure 7:
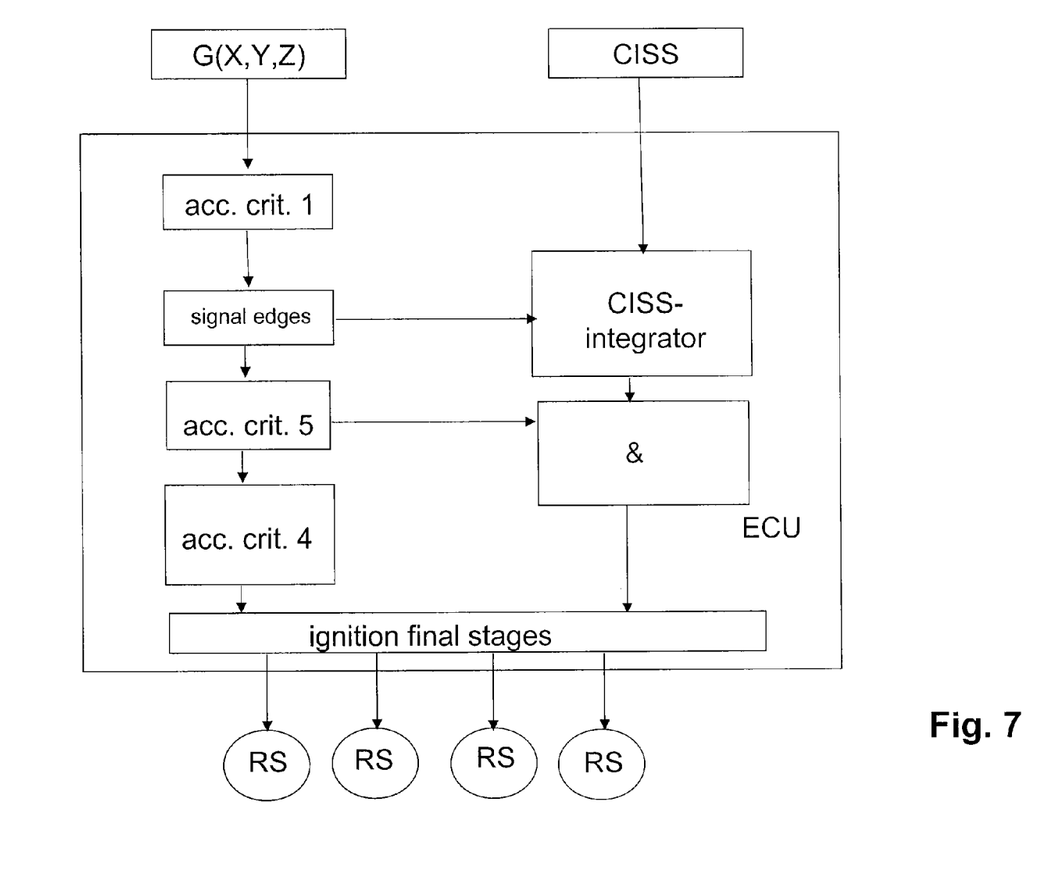
FIG. 7 block structure of a protection system in a vehicle.

FIG. 7 outlines again an example of embodiment of a protection system for carrying out the method. Thus, a controller ECU is provided, which provides sensors for acceleration (G(X,Y,Z)) and solid-borne sound (CISS), wherein they can be arranged within or outside of the controller. In some embodiments a common correspondingly wide-band solid-borne sound and acceleration sensor can be provided, which provides both signal components. From the acceleration signal a series of acceleration criteria, inter alia for example the signal edge change is provided in the ECU in terms of soft- or hardware, which starts and stops the integration of the solid-borne sound signal. If it comes to a trigger decision, the protection devices R-S are driven by the ignition output stages.

The invention claimed is:

1. A method for determining a criterion of the severity of an accident by means of an acceleration signal and a solid-borne sound signal, including:

determining, by a processor, a signal edge direction of an absolute value of the acceleration signal; and evaluating, by the processor, the solid-borne sound signal to determine the severity of the accident in response to the determined signal edge direction indicating that the absolute value of the acceleration signal is decreasing.

2. The method of claim 1, wherein the intensity of the solid-borne sound signal is evaluated for the period of time of the presence of the predetermined signal edge direction.

3. The method of claim 2, wherein the integral is determined via the absolute value of the amplitude of the solid-borne sound signal.

4. The method of claim 3, wherein the integral is compared with a threshold value during the predetermined signal edge direction and when exceeding the threshold value the criterion of the severity of an accident is set on a trigger decision.

5. The method of claim 4, wherein the integral is determined via a plurality of intervals with predetermined signal edge direction, wherein under omission of the predetermined signal edge direction the integration is stopped and the determined integration value is gradually reduced in accordance with a predetermined reduction process and with a renewed presence of the predetermined signal edge direction the integration is continued with the integration value correspondingly reduced by the reduction process.

6. The method of claim 1, wherein the determination of the criterion of the severity of an accident is started only if a minimum absolute value of the acceleration is exceeded.

7. The method of claim 1, wherein the signal edge direction is recognized from a difference of successive acceleration values and a change of signal edge direction is recognized, if the difference exceeds a predetermined threshold.

8. The method of claim 1, wherein the solid-borne sound signal is compared with a minimum threshold and the solid-borne sound signal is only evaluated if the solid-borne sound signal exceeds this minimum threshold or the signal edge of the absolute value of the acceleration signal is dropping.

9. The method of claim 1, wherein the solid-borne sound signal is compared with a minimum threshold and the acceleration signal is only evaluated if the solid-borne sound signal exceeds the minimum threshold or the signal edge of the absolute value of the acceleration signal is dropping.

10. A controller for triggering protection devices in a vehicle designed for carrying out the method according to claim 1.

* * * * *